United States Patent [19]

Connolly et al.

[11] Patent Number: 5,465,925
[45] Date of Patent: Nov. 14, 1995

[54] AUTOMATIC RELEASE OF A LOAD FROM A HELICOPTER EXTERNAL CARGO SUSPENSION SYSTEM

[75] Inventors: Christopher J. Connolly, Stamford; Thomas H. Lawrence, Seymour; Joseph J. Mankaukas, Ansonia; John J. Pawlowski, Shelton; Matthew T. Smith, Milford, all of, Conn.

[73] Assignee: United Technologies Corporation, Hartford, Conn.

[21] Appl. No.: 250,988

[22] Filed: May 27, 1994

[51] Int. Cl.$^6$ .................................................. B64D 1/12
[52] U.S. Cl. ................................. 244/137.1; 244/137.4; 395/900; 414/21
[58] Field of Search ............................... 244/137.1, 137.2, 244/137.3, 137.4, 118.2, 118.1; 364/567; 395/900; 414/21

[56] References Cited

U.S. PATENT DOCUMENTS

| | | | |
|---|---|---|---|
| 3,833,189 | 9/1974 | Fowler et al. | 244/137.4 |
| 3,866,200 | 2/1975 | Paredes et al. | 414/21 |
| 3,904,156 | 9/1975 | Smith | 244/137.4 |
| 3,946,971 | 3/1976 | Chadwick | 244/137.4 |
| 3,958,165 | 5/1976 | Boy de la Tour | 244/137.3 |
| 4,048,942 | 9/1977 | Cotton et al. | 244/137.4 |
| 4,225,926 | 9/1980 | Wendt | 244/137.3 |
| 4,350,074 | 9/1982 | Rouget et al. | 244/137.4 |
| 4,480,480 | 11/1984 | Scott et al. | 294/83 |
| 4,826,109 | 5/1989 | Camus | 244/137.4 |
| 5,260,527 | 11/1993 | Sirag, Jr. | 187/131 |

FOREIGN PATENT DOCUMENTS 4136972  5/1992  Germany .......................... 244/137.1

Primary Examiner—Andres Kashnikow
Assistant Examiner—Virna Lissi Mojica
Attorney, Agent, or Firm—Michael Grillo

[57] ABSTRACT

A helicopter external cargo suspension system (12) has load sensors (19,20) at each suspension point for sensing the magnitude of a load (32) at each suspension point. A delay period (FIG. 6) is determined based on the magnitude of the load, and a load is released if one of the following failure modes occurs for a period which exceed the delay period: one of the suspension points is unloaded, the magnitude of the load exceeds a maximum threshold magnitude, or if the distribution of the load, as indicated by the difference in magnitude at each suspension point, exceeds a difference threshold magnitude. If the magnitude of the load is below a minimum threshold magnitude, the load will be carried by one of the suspension points in response to a failure of the other suspension points.

Alternatively, the load information is converted from crisp values to fuzzy inputs (700) wherein the detected values are fuzzified by assigning a membership weight at discrete points or segments on a normalized scale; a new mode fuzzy output (707) is provided by applying a compositional rule of inference (705) across each fuzzy input (702) and a composite mode selection rule base (710), the new mode fuzzy output (707) is converted into a crisp output by taking the weighted sum of the membership weight at each point on the normalized scale in excess of a threshold value (712), and new mode is determined by comparing the new mode crisp output to a set of new mode membership ranges (FIGS. 8e and 9e).

25 Claims, 6 Drawing Sheets

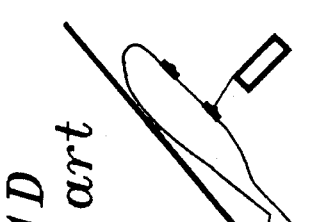
fig.1A prior art
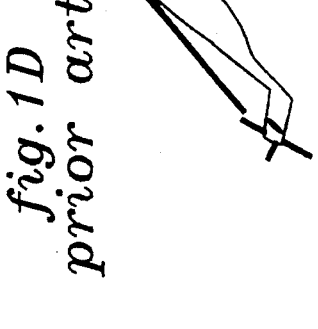
fig.1B prior art
fig.1C prior art
fig.1D prior art
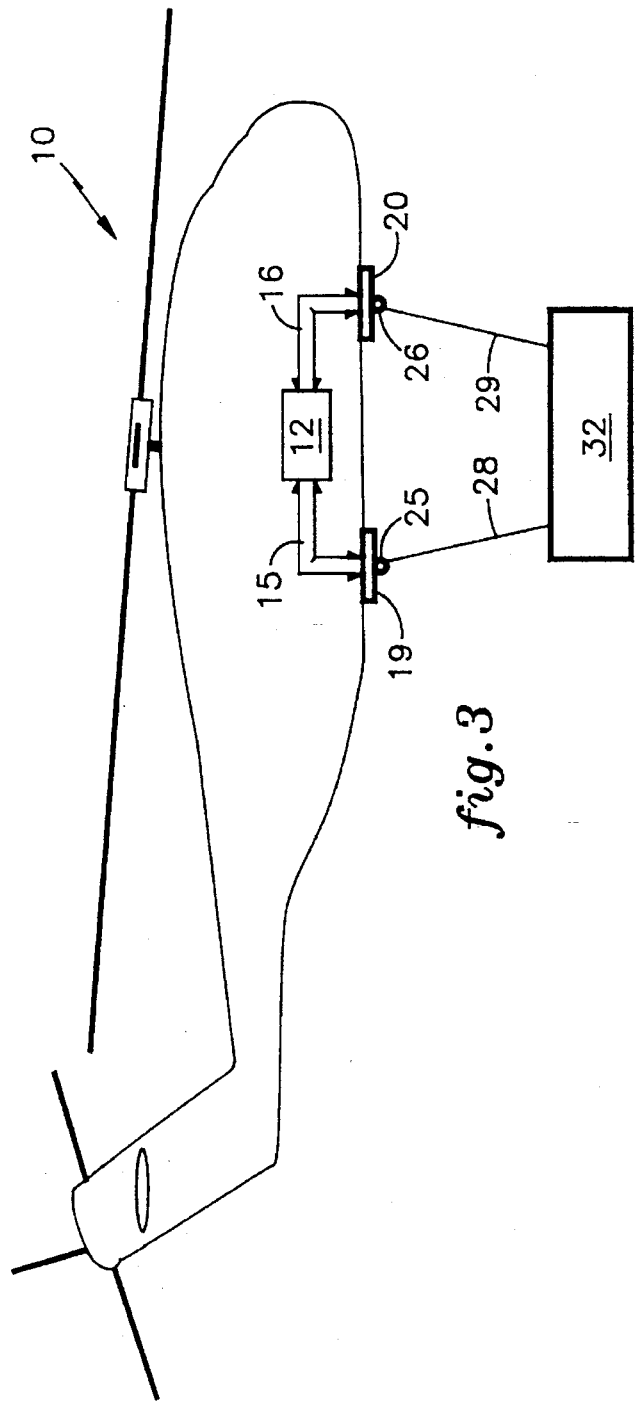
fig.3

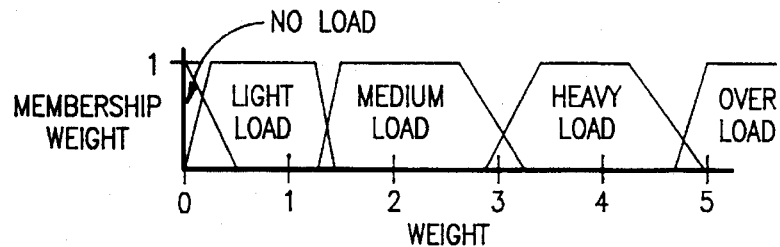
fig.8
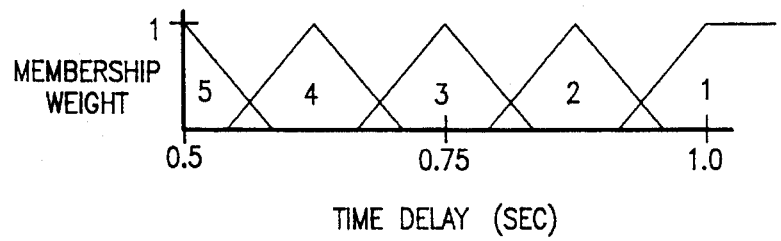
fig.9
fig.10
fig.11

AUTOMATIC RELEASE OF A LOAD FROM A HELICOPTER EXTERNAL CARGO SUSPENSION SYSTEM

TECHNICAL FIELD

The present invention relates to a system for carrying a load supported externally from a helicopter, and more particularly, to a system which automatically releases an external load supported from the bottom of a helicopter if certain failure criteria are met.

BACKGROUND OF THE INVENTION

A utility helicopter's ability to carry cargo externally is one of its most important features. Such utility helicopters are typically equipped to externally carry large, long or oddly shaped cargo provided that the cargo weight is within the lifting capacity of the helicopter. A significant advantage associated with this lifting capability is that a load may be picked up from or delivered to locations where access by other forms of transportation is difficult or impossible. Additionally, the systems do not require the helicopter to land to deliver or pick up the cargo.

Frequently, a helicopter will carry external cargo with a single or multi-point suspension system. In the case of a two point suspension system, the helicopter has two external cargo attachment points (suspension points) displaced longitudinally on the bottom of the aircraft, one on the center line forward of the aircraft center of gravity (c.g.) and one on the center line aft of the c.g. This arrangement stabilizes the cargo in yaw, thereby significantly reducing the cargo's ability to swing nose left and nose right.

A problem associated with a two point suspension system is that a failure of one suspension point results in all of the external cargo weight being supported by the other of the suspension points. The result of the total external cargo weight being supported at only one of the longitudinally displaced suspension points is the creation of large forces and moments about the aircraft c.g. (since the suspension point is on the bottom of the aircraft and some distance forward or aft of the aircraft c.g.). In some cases, these forces and moments can not be effectively resisted and the aircraft must release the load. The inability to resist these loads due to suspension point failure can be attributed to three factors: (a) the rapidity of the load application; (b) the magnitude of the load application; (c) a combination of both the rapidity and the magnitude of the load application. In the case of a rapid load application, the pilot does not have sufficient time to put in control inputs to eliminate the effects of the loads or reduce them to an acceptable level. Similarly, when the load application is of a large magnitude, the aircraft may not have sufficient inherent capability to reduce the effect of the loads to an acceptable level. The above problems are equally applicable to any multi-point suspension system upon failure of one or more of the suspension points or in the event of an uneven load distribution.

A solution to the above described failure problem is to release all external cargo suspension points in response to a failure of one of the suspension points. However, as noted above, the disruptive forces and moments may arise so quickly after a suspension point failure that the pilot or crew would be unable to release all suspension points before the aircraft response becomes severe. Referring to the example of FIG. 1, a forward suspension point failure in a two point suspension system is simulated for a CH-53E helicopter manufactured by Sikorsky Aircraft Division of United Technologies Corporation, Stratford, Conn. The following assumptions have been used in the example illustrated in FIG. 1: Aircraft weight is 36,000 lbs (16290 kg); load weight is 35,000 lbs (15840 kg); aircraft speed is 80 kts (600 m/s); and there is a 60/40 load distribution between the forward and aft suspension points, respectively. FIG. 1a shows the aircraft just prior to the failure, and FIGS. 1b through 1d show the aircraft at one second intervals after the failure. FIG. 2 is a graphical representation of the pitch rate response of the aircraft to the forward suspension point failure. As is seen in FIGS. 1 and 2, when carrying a large load using a two point suspension system, the aircraft experiences rapid and large transients upon failure of one of the suspension points (with no further action).

Because of the transient illustrated in FIGS. 1 and 2 above, an automatic cargo release system has been developed which monitors the cargo suspension points to determine if a load is attached to all suspension points. This monitoring is typically accomplished using switches which are located on hooks or attachment members which directly connect to the load. The switches are activated by the weight of the load. For example, in a two point suspension system, if one of the switches senses that no load is being applied at a suspension point for a threshold period of time, e.g., 0.5 seconds, then the load is released from both suspension points. One of the problems associated with an automatic release system of the type described herein above is that the aircraft has an ability to carry certain light loads on a single suspension point. The maximum weight which may be safely carried on one suspension point will depend on the helicopter's lifting ability. Another problem associated with the system described herein above is that for certain light loads, turbulence or aircraft maneuvers may cause an indication of no load on one of the suspension points for a time period greater than the threshold period even though the load is still securely attached. However, since the time period is exceeded, the load will still be released. A further problem with the above described system is that the location of the switches subjects them to becoming fouled with mud and debris or otherwise becoming damaged. Damage to one of the go/no go type switches may render the system inoperative or place the aircraft in an undesirable condition if a suspension point failure is not properly indicated, particularly when a heavy load is involved.

DISCLOSURE OF THE INVENTION

Objects of the invention include the provision of an improved helicopter external cargo suspension system which distinguishes between the transient unloading of suspension points and a failure of suspension points, thereby decreasing the number of unnecessary releases of loads carried by the suspension system.

A further object of the invention is to provide a helicopter external cargo suspension system which measures the actual magnitude of a load at each suspension point to allow detection of an unsafe load distribution between the points, the detection of an overload condition, and the determination of whether the weight of a load is less than the weight which can be safely carried on one suspension point without causing unacceptable disturbances to the aircraft.

A still further object of the invention is to provide a helicopter external cargo suspension system which utilizes fuzzy logic for incorporating in its load release control the judgment and operations of an expert pilot, whereby load release judgments resembling those made at the evaluation of an expert pilot become possible.

According to the present invention, a helicopter external cargo suspension system comprises load sensors for sensing the magnitude of a load at each suspension point, a delay period is determined based on the magnitude of the load, and a load is released if one of the suspension points is unloaded for a period which exceeds the delay period.

In further accord with the present invention, if the magnitude of the load is below a minimum threshold magnitude, the load will be carried by one of the suspension points in response to a failure of the other suspension points.

In still further accord with the present invention, a load is released from all suspension points if the magnitude of the load exceeds a maximum threshold magnitude or if the distribution of the load, as indicated by the difference in magnitude at each suspension point, exceeds a difference threshold magnitude, the difference threshold magnitude being determined based on the total magnitude of the load.

According further to the present invention, the load at each suspension point is measured, and the load information is converted from crisp values to fuzzy inputs wherein the detected values are fuzzified by assigning a membership weight at discrete points or segments on a normalized scale; a new mode fuzzy output is provided by applying a compositional rule of inference across each fuzzy input and a composite mode selection rule base, the new mode fuzzy output is converted into a crisp output by taking the weighted sum of the membership weight at each point on the normalized scale in excess of a threshold value, and new mode is determined by comparing the new mode crisp output to a set of new mode membership ranges including a membership range corresponding to releasing the load from all suspension points, a new mode membership range corresponding to retaining the load on all suspension points, and a new mode membership range corresponding to the retention of the load on at least one suspension point when the other suspension points have failed.

The present invention provides a significant improvement over the prior method of controlling the retention or release of a load in an external cargo suspension system. The new system recognizes the ability of an aircraft to carry loads below a certain weight upon failure of one of the suspension points. Additionally, the system provides for a variable time limit or time delay corresponding to the release of the load when one of the suspension points becomes transiently or variably unloaded for a time due to a maneuver or atmospheric turbulence. Therefore, inadvertent release of lighter loads is minimized by increasing the time limit for lighter loads. The system also provides for the recognition of an overload situation to prevent the aircraft from lifting a load which exceeds an overload limit. Finally, the system provides for the recognition of an out of balance situation which may be caused by the redistribution of weight due to a maneuver or turbulence. Under these circumstances, the system acts in the same way as it would act upon a failure of one of the suspension points to prevent an undesirable transient upon the aircraft. In summary, the system provides for the recognition of three possible failure modes, e.g., overload, unbalanced load, and suspension point failure, and determines the appropriate action for each failure mode based on the operating conditions of the aircraft.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 1a through 1d are diagrams showing an aircraft carrying a load using a two point suspension system just prior to the failure of the forward suspension point and at one second intervals thereafter, respectively;

FIG. 3 is a diagram of the two point suspension system of the present invention mounted on a helicopter;

FIG. 8 is a graph showing a fuzzy set of membership ranges for load weight on each attachment point;

FIG. 9 is a table showing the membership weight at each point on a normalized scale for load weight;

FIG. 10 is a graph depicting 25 mode selection rules; and

FIG. 11 is a graph showing a fuzzy set of membership ranges for determining a crisp value of time delay based on a new mode fuzzy output.

BEST MODE FOR CARRYING OUT THE INVENTION

Figure 2:
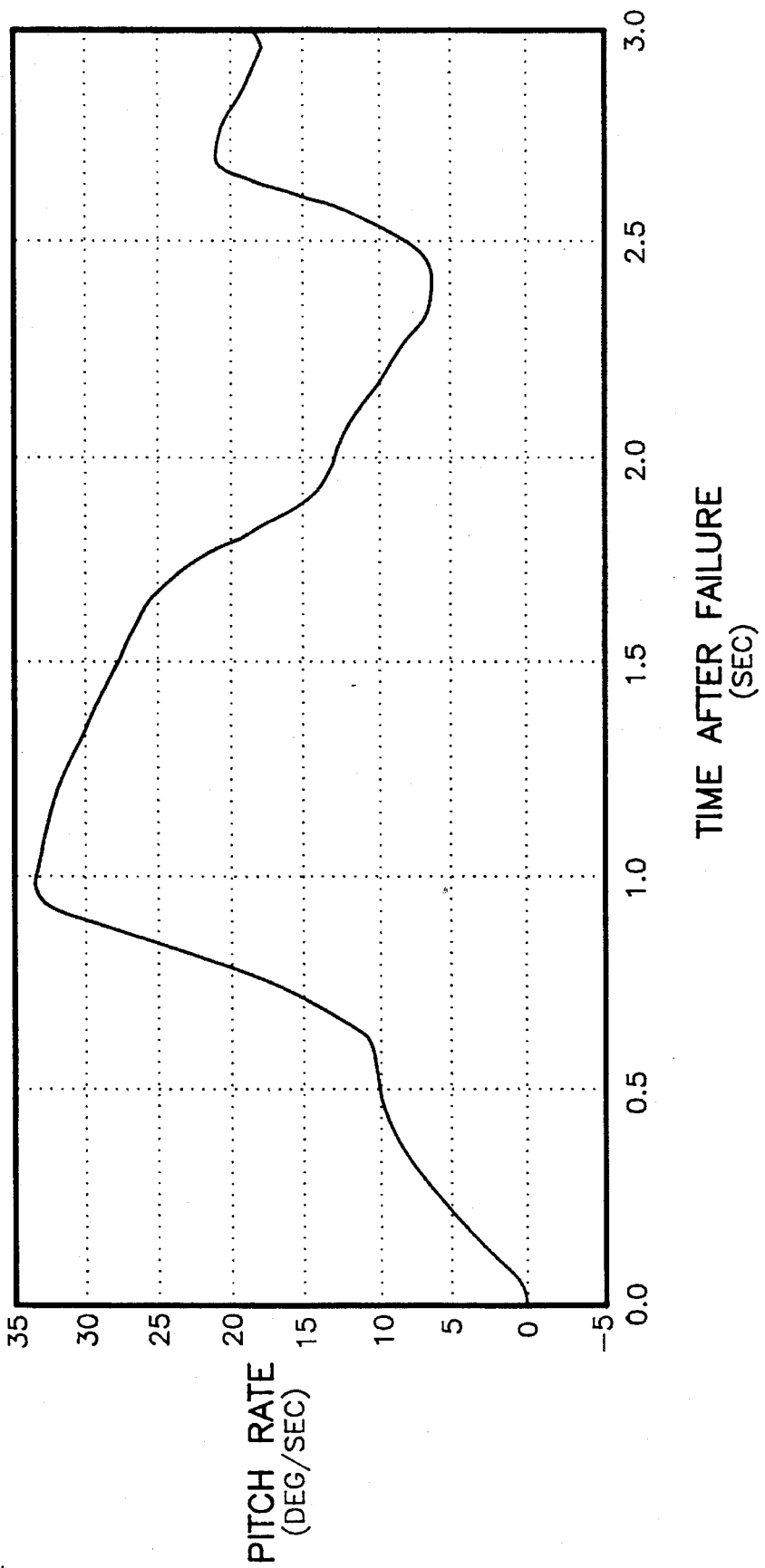
FIG. 2 is a graph showing the pitch rate response of the aircraft to the forward suspension point failure of FIG. 1.

The helicopter external cargo suspension system of the present invention is particularly well suited for providing improved control of a load suspended from a helicopter. The system provides the improved features of recognizing an overload condition, retaining a load having a weight below a minimum threshold value suspended from one of the suspension points in the event of the failure of the other suspension points, providing a variable time delay to minimize the unnecessary release of a load during a transient unloading of one of the suspension points, and providing the recognition of an unbalanced load condition which may be as hazardous to the aircraft as a complete failure of one of the suspension points.

The following examples of the present invention will be described in the context of a helicopter two point external cargo suspension system for ease of explanation and understanding. However, it will be understood by those skilled in the art that the principles of the present invention are applicable to single point suspension and multi-point suspension, as described in greater detail hereinafter.

Referring to FIG. 3, the system is shown installed on a helicopter 10. A control unit 12 of the system receives signals on lines 15 and 16 from a pair of load cells 19, 20 indicative of the magnitude of a load being carried by each suspension point. Additionally, the control unit 12 provides control signals on the line 15 and 16 to the suspension points to control the automatic release of the load. Restraining members 25, 26 provide connection points for elastic cables or lines 28, 29 for providing a two point suspension connection of a load 32 to the helicopter 10. For purposes of describing the present invention, the term "suspension point" is intended to refer to a load cell 19,20, a retaining member 25,26 and a line 28,29 acting in cooperation to provide an attachment between the load 32 and the helicopter 10. As illustrated in FIG. 3, there are two suspension points associated the system of the present invention. In the event of the failure of one of the suspension points, an unbalanced load, or an overload, the control unit 12 will control the retaining members 25, 26 to release the lines 28,29, thereby releasing the load 32. A suspension point failure may occur due to a failure of a load cell 19,20, a retaining member 25,26 or a line 28,29, or a failure of the attachment point on the load itself, e.g., the bumper comes off of a vehicle carried by the suspension system.

Figure 4:
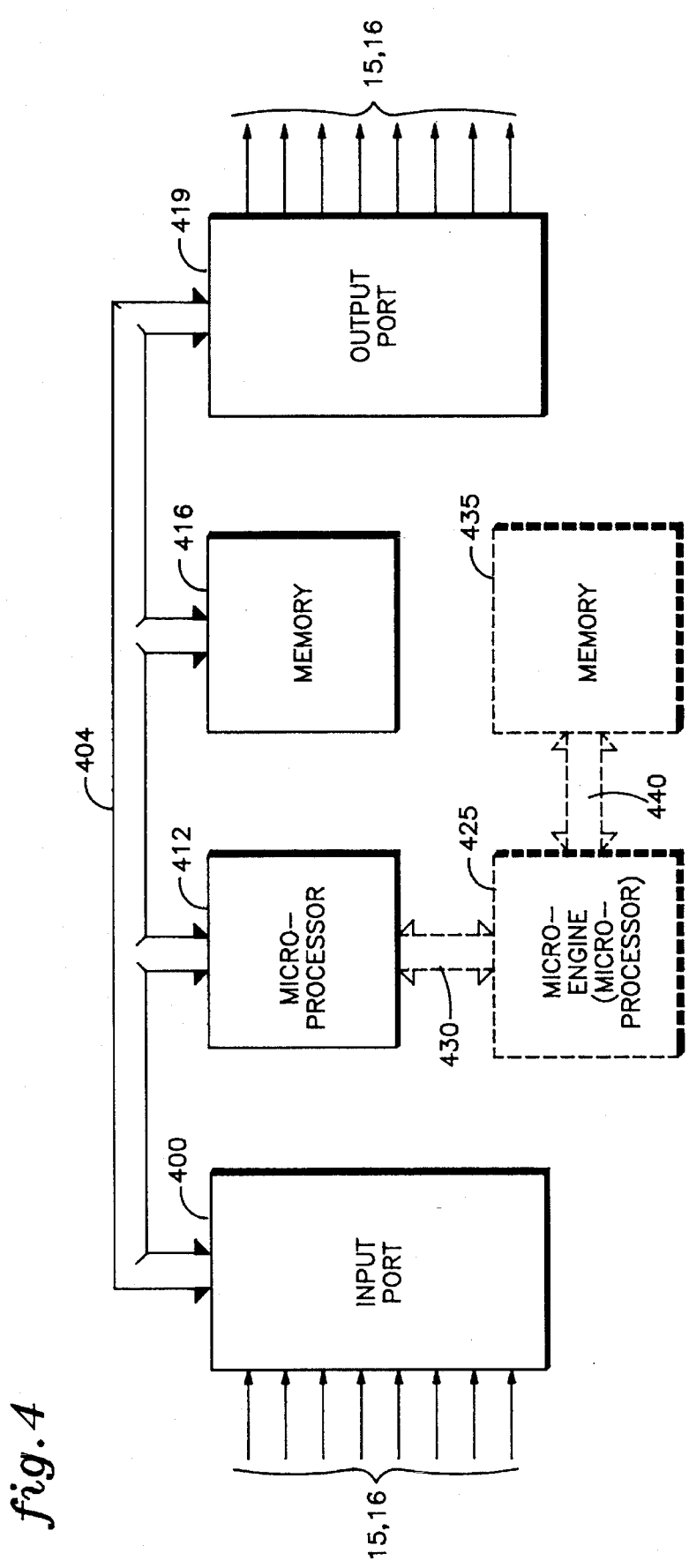
FIG. 4 is a more detailed schematic block diagram of the system of FIG. 3.

FIG. 4 shows the architecture of a microprocessor based control system 12. In FIG. 4, a first embodiment of the invention is shown in solid lines, and a second embodiment of the invention is shown in dashed lines. Referring to FIG. 4, weight signals are provided from the load cells 19, 20 (FIG. 3) on lines 15 and 16 via an input port 400. Depending on the format of the input signals, e.g., analog or digital, the input port may include an analog to digital converter, a frequency to digital converter, and such other signal conditioning functions known to those skilled in the art as being required to transform the input signals to a digital signal format.

The input port is connected through an address/databus 404 to a system microprocessor 412, e.g., an INTEL 80386, Motorola 68040, etc., a digital memory 416, e.g., RAM, UVPROM, EEPROM, etc., and an output port 419. The output port 419 may comprise a digital to analog converter, a parallel to series converter, a discrete output driver, and such other signal conversion functions known to those skilled in the art as being required to transform the digital signal format to that required by the system output function. The output port lines 15, 16 provide control signals to control the operation of the retaining members 25, 26 (FIG. 3) for retaining or releasing a load as required.

The microprocessor based control system described thus far is intended to be exemplary of the type of control system which may be used to implement a first embodiment of the two point suspension system in accordance with the present invention. However, as will be understood by those skilled in the art, there are a variety of alternative microprocessor and computer architecture and systems which may be used to implement the present invention.

Figure 5:
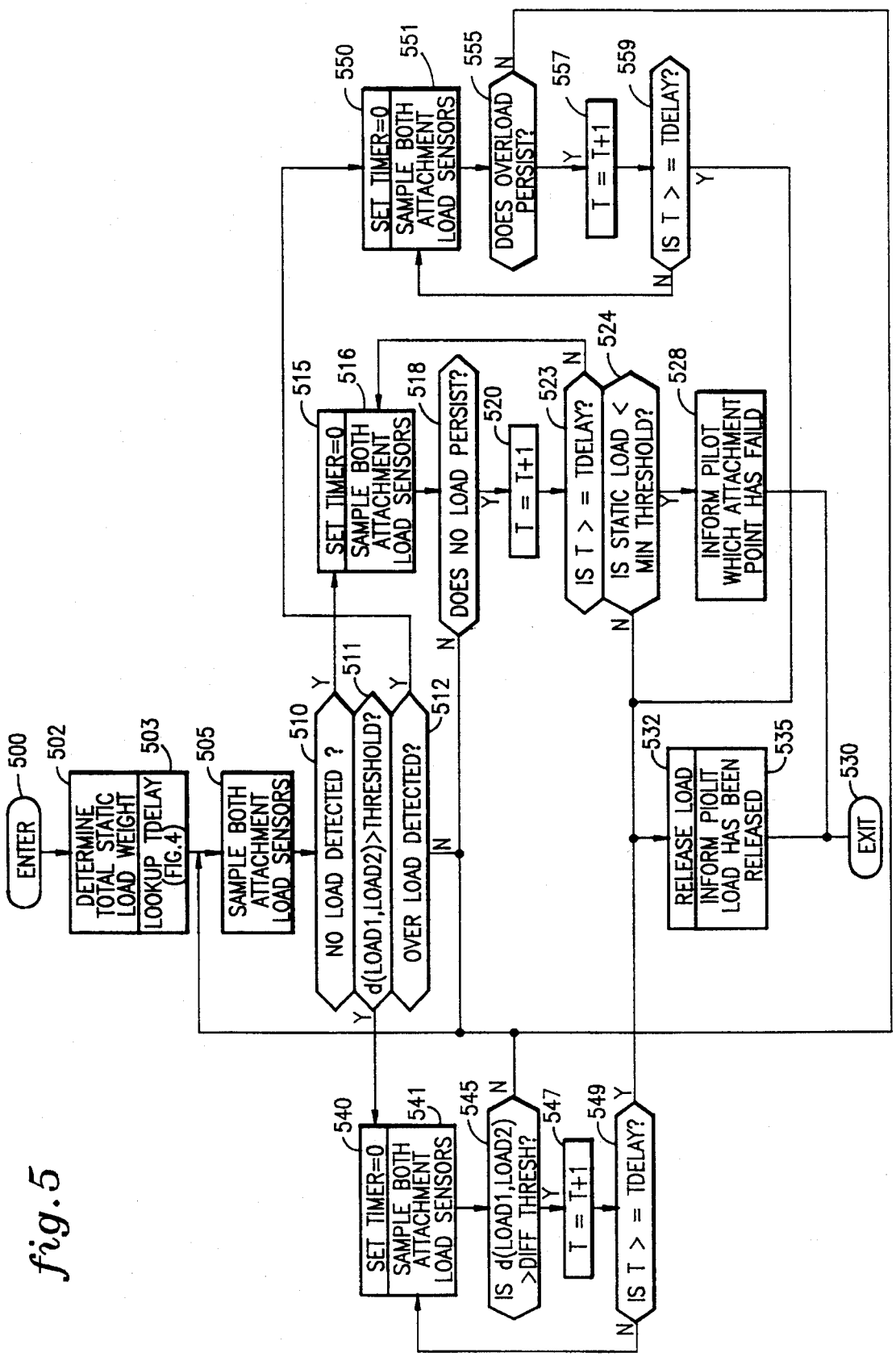
FIG. 5 is a logic flow diagram utilized by the system of FIG. 4 for controlling a load suspended by the system.
Figure 6:
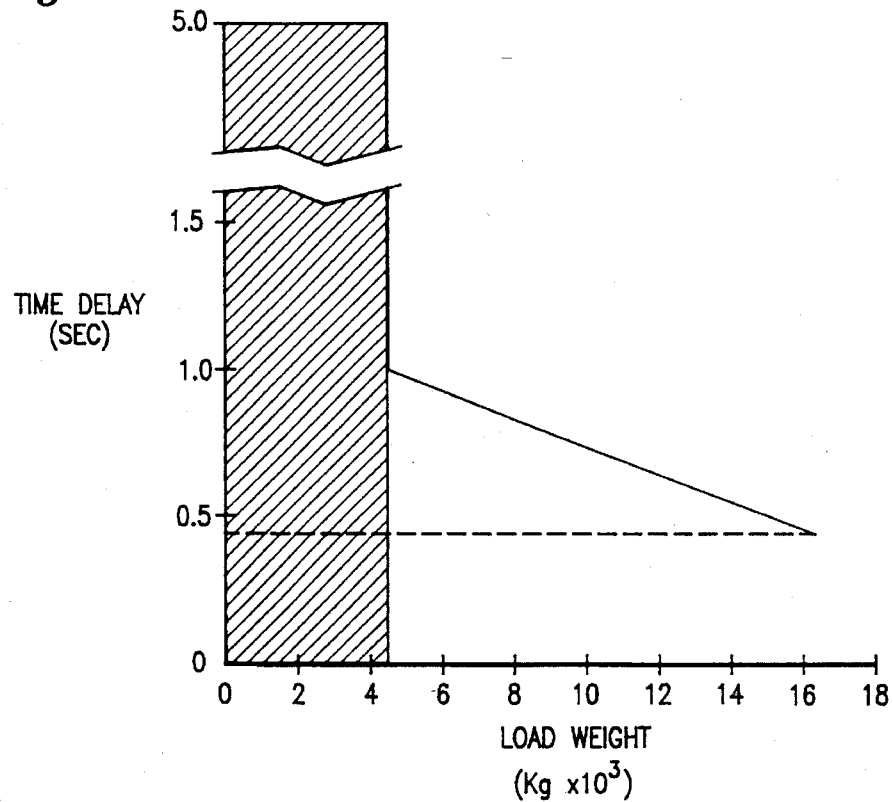
FIG. 6 is a graph showing the relationship between a delay time and the weight of a load suspended by the two point suspension system of FIG. 3.

The load control provided by the system of the present invention may be implemented with a routine of the type illustrated in FIG. 5, such routine being resident in the memory 416 (FIG. 4) and executable by the microprocessor 412. Upon activation of the load control system, the subroutine is entered in a step 500 and thereafter steps 502 and 503 are performed wherein the total static load weight is determined (by polling the load cells 19, 20 in FIG. 3), and a time delay is determined based on the total static load weight measured in step 502. The time delay is determined using the graph illustrated in FIG. 6. Referring to FIG. 6, the graph shows that if the load is below a threshold or minimum load weight, e.g., 10,000 pounds (4500 kilograms), then the duration of the time delay is large, e.g., 5 seconds. Upon failure of one of the suspension points, the other suspension point is not required to be released if the load is below the minimum threshold, and the time delay is infinite in theory. However, a long time delay is established for such a situation so that the pilot may be informed of the suspension point failure. For load weights above the minimum threshold, the duration of the time delay decreases with increasing load weight up until a maximum load weight, e.g., 36,000 pounds (16,300 kilograms), which represents the maximum load which the aircraft may attempt to lift.

Returning to FIG. 5, once the time delay is determined in step 503, a step 505 is performed wherein both load cells are again sampled. Next, the system checks in test 510, 511 and 512 if a failure mode of the system has occurred. First, test 510 is performed wherein the microprocessor checks if one of the load cells is detecting a no load condition. If the results of the test 510 are negative, a test 511 is performed wherein the microprocessor compares the difference between the two load cells to a difference threshold magnitude to determine if an out of balance condition exists. If the results of the test 511 are negative, an unbalanced condition does not exist and a test 512 is performed to determine if an overload has been detected, e.g., the sum of the two load cells is greater than the maximum threshold allowed. If the results of the test 512 are negative, the subroutine returns to the step 505.

If the results of the test 510 are positive, one of the load cells has detected a no load condition which is indicative of a failure of one of the suspension points. Next, steps 515 and 516 are performed wherein a timer is set equal to zero (reset) and both load cells are sampled. Thereafter, a test 518 is performed to determine if the no load indication persists. If the results of the test 518 are positive, the timer is incremented in a step 520 and then a step 523 is performed to determine if the timer time is greater than or equal to the delay time determined in step 503. If the results of the test 523 are negative, the subroutine returns to the steps and test 516 through 520 to again determine if the no load condition persists. If the no load condition persists for a period greater than the delay period, then a suspension point failure is determined, and a test 524 is performed to determine if the total static load is less than or equal to the minimum threshold value which corresponds to the maximum weight which may be retained by one of the suspension points. If the results of the test 524 are positive, then the load may be retained by one suspension point and a step 528 is performed wherein the pilot is informed that one of the suspension points has failed. The subroutine then exits in a step 530. However, if the results of the test 524 are negative, then the load is greater than a load which may be retained by one suspension point, and a step 532 is performed wherein the total load is released. Next, the pilot is informed that the load has been released in a step 535, and then the subroutine exits in the step 530.

If the no load condition was caused by a transient or maneuver the duration of which was shorter than the delay period of step 503, then the results of the test 518 will be negative before the expiration of the delay period, and the subroutine returns to the step 505.

If the results of the test 511 are positive, then an out of balance condition exists which may cause a dangerous helicopter transient. Therefore, steps 540 and 541 are performed wherein the timer is set equal to zero (reset) and both of the load cell sensors are sampled. Next, a test 545 is performed to determine if the out of balance condition continues to persist. If the results of the test 545 are positive, the timer is incremented in a step 547, and then the step 549 is performed to determine if the timer is greater than or equal to the delay period from step 503. If the results of the test 549 are negative, the subroutine returns to the steps and tests 541 through 547 to check if the out of balance condition persists. If the out of balance condition is not a transient condition, but persists for a period greater than the delay period, the results of the test 549 will be positive and steps 532 and 535 are performed wherein the load is released and the pilot is informed that the load has been released. The subroutine then returns in the step 530. However, if the out of balance condition is only a transient condition which lasts for a period which is shorter than the delay period, the results of the test 545 will be negative, and the subroutine returns to the step 505.

If the results of the test 512 are positive, then an overload condition exists, and the subroutine reaches the steps 550 and 551 wherein the timer is set equal to zero (reset) and both of the load cell sensors are sampled. Next, a test 555 is performed to determine if the overload condition persists. If the results of the test 555 are positive, the timer is incremented in a step 557, and then a test 559 is performed to determine if the timer time is greater than the delay period from step 503. If the results of the test 559 are negative, the subroutine returns the steps and tests 551 through 557 to check if the overload condition persists for a period greater than the delay period. If the overload condition was caused by a temporary transient condition, such as a maneuver, the duration of which is shorter than the delay period, then the results of the test 555 will be negative and the subroutine returns to the step 505. However, if the overload condition persists for a period greater than the delay period, the results of the test 559 will be positive and the subroutine will reach the steps 532 and 535 wherein the load is released and the pilot is informed that the load has been released. The subroutine then exits in the step 530.

Figure 7:
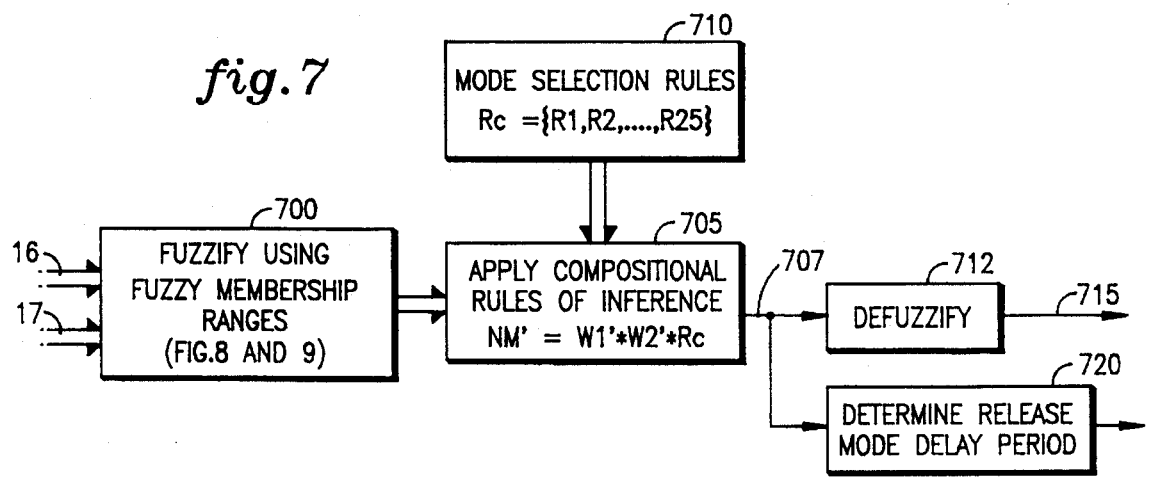
FIG. 7 is a simplified schematic block diagram of an alternative system for controlling a load suspended by the two point suspension system of FIGS. 3 and 4.

The system of the present invention has been described thus far as logic implemented using a subroutine of the type illustrated in FIG. 5. However, a more sophisticated control may be provided which is based on expert pilot judgment, and implemented using for example fuzzy logic. An alternative embodiment of the system of the present invention is shown in FIGS. 4 and 7. In FIG. 4, the fuzzy logic system may be resident and executable in a micro-engine (microprocessor) 425 which is interfaced with the system microprocessor 412 via a databus 430. The micro-engine should be the same or compatible with the system microprocessor 412, e.g., an INTEL 80386, Motorola 68040, etc. The micro-engine 425 may be provided with a dedicated digital memory 435, e.g., RAM, UVPROM, EEPROM, etc., which it is interfaced with via a databus 440. Referring to FIG. 7, the load weight at each attachment point (W1 and W2) is provided on the lines 15 and 16 to a fuzzification function 700 which converts the input parameter crisp values into fuzzy input values, i.e., W1', W2'. The fuzzification function 700 coverts the range of possible values for each of the operating parameters used by the mode control into a normalized scale as described below with respect to FIGS. 8 and 9. The normalized scale in effect discretizes a universe into a certain number of segments or quantization levels. Each segment in the discrete universe is labeled as a generic element ($u_i$ where i equals 0, 1, . . . n) during fuzzification, and each fuzzy input is defined by assigning a membership weight ($\omega_i$) at each generic element of the new discrete universe. After fuzzification, each fuzzy input is represented as a set of ordered pairs of generic elements and corresponding membership weights ($u_i$, $\omega_i$).

One method of assigning membership weights to a fuzzy input involves the following steps:

1. Convert the input crisp value into a normalized value (IV).
2. Find the normalized scale segment $u_i$ that is the nearest value (NV) to IV.
3. Find the normalized scale segment $u_i$ that is the next nearest value (NNV) to IV.
4. Assign a membership weight $\omega_{NV}$ of 1.0 to NV.
5. Determine the membership weight $\omega_{NNV}$ for NNV using equation 1 below:

$$\omega_{NNV} = {}^{(IV-NV)}/_{(NNV-IV)} \qquad \text{(eq. 1)}$$

Alternatively, the membership weight $\omega_{NV}$ can be determined using equation 2 below:

$$\omega_{NV} = {}^{(IV-NNV)}/_{(NV-NNV)} \qquad \text{(eq. 2)}$$

Thereafter, the membership weight $L_{NNV}$ for NNV is determined using equation 3 below:

$$\omega_{NNV} = 1 - \omega_{NV} \qquad \text{(eq. 3)}$$

The fuzzification of the input parameters is best understood by example. If the scale is discretized into 6 segments, $u_i$, i=0, 1, . . . 5, and the range of possible values for weight are between 0 and 10, e.g., between 0 and 10,000 kilograms, then each segment represents 2 units of weight. If a crisp value of W1=3.5 is received for weight, the following fuzzy input (W1') is provided using the first method above for determining membership weight:

$$W1'(u_i,\omega_i) = \{(0,0),(1,0.33),(2,1),(3,0),(4,0),(5,0)\}$$

Using the second method described above for determining membership weight, the following fuzzy input is provided:

$$W1'(u_i,\omega_i) = \{(0,0),(1,0.25),(2,0.75),(3,0),(4,0),(5,0)\}$$

The fuzzy input provided by the second method above must be normalized by dividing each membership weight by the membership weight having the largest magnitude. This normalization process produces the following results:

$$W1'(u_i,\omega_i) = \{(0,0),(1,0.33),(2,1),(3,0),(4,0),(5,0)\}$$

FIG. 8 graphically depict the fuzzy membership range for each of the attachment points, e.g., an individual fuzzy input (W1' and W2') is determined for each of the attachment points. The scale on the horizontal axis is the segment value $u_i$, and the vertical axis scale is the membership weight $\omega_i$. The scale factor relating weight to the segment value is 2, and as will be understood by those skilled in the art, an actual value of weight may be obtained by multiplying the segment value by the scale factor.

The individual membership ranges for each of the input parameters represents a specific term or characteristic of the input parameter, e.g., light, heavy, etc., and the membership weight assigned to an input parameter within a membership range varies as the magnitude of the input parameter changes. For example, weight on one of the attachment points is considered to be a light load provided that the weight on the attachment point (normalized) is between 0 and 1.5. However, the membership weight for a load of 1.0 (normalized) is 1.0 while the membership weight for a load of 1.3 (normalized) is approximately 0.5.

The fuzzy membership ranges can also be represented using a numerical definition which defines the membership weight $\omega_i$ for each quantization level or segment $u_i$. The numerical definition of the fuzzy membership ranges for weight is shown in FIG. 9. The numerical definition of FIG. 9 correspond to the sets of membership ranges depicted graphically in FIG. 8.

Mode selection rules characterize expert pilot experience and control engineering knowledge for making mode selection decisions. The rules are expressed as IF-THEN fuzzy conditional statements. The rules are based on the characteristics defined by the membership ranges for each of the input parameters. The present invention utilizes 25 mode selection rules for selecting a new mode. The rules determine the new mode attachment status based on the fuzzified weight on each attachment point. The following table is intended to provide a simplified overview of the rules for determining a fuzzified value for new mode (NM'):

| Rule | W1' | W2' | NM' |
| --- | --- | --- | --- |
| 1 | No Load | No Load | No Action |
| 2 | No Load | Light Load | Retain on One |
| 3 | No Load | Medium Load | Release Mode 1 |
| 4 | No Load | Heavy Load | Release Mode 2 |
| 5 | No Load | Over Load | Release Mode 3 |
| 6 | Light Load | No Load | Retain on One |
| 7 | Light Load | Light Load | Retain On Both |
| 8 | Light Load | Medium Load | Retain On Both |
| 9 | Light Load | Heavy Load | Retain On Both |
| 10 | Light Load | Over Load | Release Mode 3 |
| 11 | Medium Load | No Load | Release Mode 1 |
| 12 | Medium Load | Light Load | Retain On Both |
| 13 | Medium Load | Medium Load | Retain On Both |
| 14 | Medium Load | Heavy Load | Retain On Both |
| 15 | Medium Load | Over Load | Release Mode 3 |
| 16 | Heavy Load | No Load | Release Mode 2 |
| 17 | Heavy Load | Light Load | Retain On Both |
| 18 | Heavy Load | Medium Load | Retain On Both |
| 19 | Heavy Load | Heavy Load | Retain On Both |
| 20 | Heavy Load | Over Load | Release Mode 4 |
| 21 | Over Load | No Load | Release Mode 3 |
| 22 | Over Load | Light Load | Release Mode 3 |
| 23 | Over Load | Medium Load | Release Mode 3 |
| 24 | Over Load | Heavy Load | Release Mode 4 |
| 25 | Over Load | Over Load | Release Mode 5 |

The table is read as 25 IF-THEN conditional statements, the results being the new mode fuzzy outputs. For example, with respect to Rule 10, the table should be read as follows:

If the weight on attachment point 1 is Light Load; and the weight on attachment point 2 is Over Load; then new mode is Release Mode 3.

As will be described in greater detail hereinafter with respect to FIG. 11, each release mode has associated therewith a time delay after which a load must be released. The above rules may also be depicted graphically, as shown in FIG. 10, to provide the new mode output.

The rules may be stored in the digital memory 435 and provided to the micro-engine 425 which employs on-line processing to determine the new mode output for a given input. During on-line processing, all of the mode selection rules are analyzed in an inference function 705 to determine the maximum membership weight for the specific combination of fuzzified input parameters across all of the rules. The output of the inference function 705 is the fuzzified value of new mode (NM') on line 707. The inference function 705 applies a compositional rule of inference across each fuzzy input and the mode selection rules, $R_c$ 710. The fuzzified value of new mode on the line 707 is in the form of a set of ordered pairs of segments and corresponding membership weights ($u_i$, $\omega_i$) where i= 0, 1, . . . ,5, for each of the membership rules.

The fuzzified value of new mode is applied to a defuzzification function 712 which converts the fuzzified value of new mode into a crisp value. The defuzzification function 712 uses a center of gravity (CG) method to defuzzify the fuzzified value of new mode and thereby provide a crisp new mode value on the line 715. For example, if the load on attachment 1 is relatively light and the load on attachment 2 is relatively heavy, then it is expected that mode selection rules 4, 5, 9 and 10 will provide the new mode fuzzy outputs having the largest membership weights. As the attachment 2 status tends more towards the "Over Load" membership set, then it is expected that the "Release" mode fuzzy output will have a proportionately larger membership weight relative to other fuzzy output, and the resultant crisp output will be "Release".

The fuzzified value of new mode is also provided on the line 707 to a function 720 which converts the fuzzified value of new mode into a crisp delay period. Referring to FIG. 11, a membership function which relates new mode fuzzy output to delay period is provided. At the same time that the crisp value of new mode is being determined, the degree of membership in each of the delay period membership ranges is determined for the fuzzy output of all of the mode selection rules, and the center of gravity method is thereafter used to provide a crisp delay period on the line 725. In the above example, the delay period will be determined primarily based upon the results of rules 4, 5, 9 and 10. As the attachment 2 status tends more toward "Over Load", the delay will tend more towards delay period 3. However, if the attachment 1 status is primarily "Light Load" and the attachment 2 status is primarily "Heavy Load", the it is expected that the crisp value of new mode will be "Retain on Two", and the delay period will be ignored.

If the new mode output of the defuzzification function 712 is a retain mode, e.g., retain the load on one or both suspension points, then the delay period is ignored. However, if the new mode output is a release mode, the delay period on the line 725 is used to determine the time before the load is released. In practice, once a crisp value of new mode corresponding to the release of the load is received, the microengine will initialize an internal clock or register, and thereafter provide a release signal once the clock or register indicates that a time period greater than or equal to the delay period has expired. If the crisp value of new mode changes to one of the retain modes prior to the expiration of the delay period, then the clock or register is reset and the load is not released.

The present invention is described herein as using 25 mode selection rules to determine a new mode output. However, additional rules may be provided to further enhance the mode selection performance.

Although the fuzzy membership ranges are defined in FIGS. 8 and 9, these ranges may be modified as necessary to enhance mode selection performance or to accommodate additional mode selection rules. Additionally, any cycle times, gains, counts, and the like contained herein may of course be adjusted to suit any implementation and utilization of the invention. For example, it will be understood that the weights referred to herein, e.g., the load which can be carried on one suspension point and the maximum load, relate to a specific helicopter model, and actual weights will vary depending on the type of helicopter the system is used with.

The method of defuzzification described herein provides a crisp output as the weighted sum of ordered pairs having a membership weight above a threshold magnitude. However, it is anticipated that any suitable defuzzification method may be employed without departing from the spirit and scope of the present invention.

Rather than providing on-line processing of the mode selection rules as described in the example of the present invention above, the results of each of the mode selection rules for all possible combinations of input values may be tabulated to thereby provide an M-dimensional array, where M is the number of input parameters and control outputs, i.e., a three dimensional array including two input parameters and one control output. In effect, the array is a look-up table where each location in the array comprises the combination results obtained from the minimum Cartesian cross product of the conditional statement for each input parameter at each possible input value $u_i$. That is, for each input parameter combination ($u_{w1i}$, $u_{w2i}$) where i= 0, 1, . . . ,5, the minimum membership weight $\omega_i$ for each combination, as determined for example by applying the numerical definitions in FIG. 9 to the rule, determine the minimum membership weight for the given combination. For example, the Rule 10 array position (0,0,0) contains a membership weight of 0 because the membership weight assigned to "weight is over load" at segment 0 is equal to 0. Similarly, the Rule 1 array position (0,0,0) contains a membership weight of 1 because the membership weight of each of the conditional statements in the rule have a value of 1 at segment 0. During the determination of the array, all of the mode selection rules are analyzed to determine the maximum membership weight for each combination of input parameters across all of the rules to provide the membership weight to be stored in a corresponding location in a composite mode selection rule base $R_C$. The membership signal stored at each location in the array is a composite mode selection signal. It is desirable to derive the composite mode selection rule base only once, and thereafter provide it as a look-up table which defines an output for all possible combinations of operating parameters. By providing the look-up table using off-line processing, on-line processing is freed up for other operations and run time is minimized. The fuzzy membership ranges and mode selection rules are only used during the off-line processing to derive the composite mode selection rule base. Because the composite rule base is provided as a look up table, the number of rules can be increased without increasing on line run time because each rule is accounted for in the composite mode selection rule base in updated off-line processing.

The present invention was described herein as being incorporated in a helicopter two point external cargo suspension system. However, it will be understood by those skilled in the art that the principles of the present invention are applicable to single point and multi-point external cargo suspension systems. With respect to a single point suspension system, the weight measuring and overload features of the present invention may be employed to provide an improved margin of safety when handling a load from a single suspension point. In a system having more than two suspension points, all of the features of the present invention are applicable. However, as will be obvious to those skilled in the art, additional rules and logic will be provided to deal with situations such as a load being retained on 2 of 3 or 1 of 3 suspension points in a three point system or 3 of 4, 2 of 4 or 1 of 4 suspension points in a four point system.

Although the invention has been shown and described with respect to exemplary embodiments thereof, it should be understood by those skilled in the art that the foregoing and other changes, omissions, and additions may be made therein and thereto without departing from the spirit and scope of the present invention.

We claim:

1. A helicopter external cargo suspension system, comprising:

at least one suspension point for externally suspending cargo from the helicopter;

each suspension point having a load sensor for sensing the weight exerted by cargo at each suspension point and for providing weight signals indicative thereof;

each suspension point having disconnect means responsive to the absence of a disconnect signal for maintaining a connection between the helicopter and cargo via said suspension point and responsive to the presence of said disconnect signal for disconnecting cargo from the helicopter;

signal processing means responsive to said weight signals for determining if a failure mode has occurred, and for providing a disconnect signal to all of said disconnect means if a failure mode is determined.

2. A helicopter external cargo suspension system according to claim 1 further comprising:

delay means for calculating a delay period based on the total weight of cargo as indicated by the sum of said weight signals; and said signal processing means providing a disconnect signal to all of said disconnect means only if the duration of said failure mode exceeds said delay period.

3. A helicopter external cargo suspension system according to claim 2 wherein said failure mode is determined in response to the sum of said weight signals exceeding an overload weight limit.

4. A helicopter external cargo suspension system according to claim 2 wherein said failure mode is determined in response to the failure of one of said suspension points.

5. A helicopter external cargo suspension system according to claim 4 wherein the failure of one of said suspension points is indicated by said corresponding weight signal for said suspension point being less than a minimum weight limit.

6. A helicopter external cargo suspension system according to claim 5 wherein said minimum weight limit is approximately zero kilograms (zero pounds).

7. A helicopter external cargo suspension system according to claim 2 wherein said failure mode is determined in response to an out of balance cargo condition.

8. A helicopter external cargo suspension system according to claim 7 wherein said out of balance cargo condition is indicated by the difference between said weight signals exceeding an out of balance weight limit.

9. A helicopter external cargo suspension system according to claim 1 further comprising display means for indicating to a pilot the nature of said failure mode.

10. A helicopter external cargo suspension system according to claim 2 wherein said signal processing means does not provide a disconnect signal if the sum of said weight signals is below a minimum threshold magnitude.

11. A helicopter external cargo suspension system according to claim 2 wherein the duration of said delay period is inversely proportional to the sum of said weight signals.

12. A helicopter external cargo suspension system according to claim 11 wherein said signal processing means does not provide a disconnect signal if the sum of said weight signals is below a minimum threshold magnitude.

13. A helicopter external cargo suspension system according to claim 12 wherein said failure mode is determined in response to the sum of said weight signals exceeding an overload weight limit.

14. A helicopter external cargo suspension system according to claim 13 wherein said failure mode is determined in response to the failure of one of said suspension points.

15. A helicopter external cargo suspension system according to claim 14 wherein the failure of one of said suspension points is indicated by said corresponding weight signal for said suspension point being less than a minimum weight limit.

16. A helicopter external cargo suspension system according to claim 15 wherein said minimum weight limit is approximately zero kilograms (zero pounds).

17. A helicopter external cargo suspension system according to claim 14 wherein said failure mode is determined in response to an out of balance cargo condition.

18. A helicopter external cargo suspension system according to claim 17 wherein said out of balance cargo condition is indicated by the difference between said weight signals exceeding an out of balance weight limit.

19. A helicopter external cargo suspension system according to claim 17 further comprising display means for indicating to a pilot the nature of said failure mode.

20. A helicopter external cargo suspension system according to claim 19 wherein each of said suspension points further comprises:

support lines; and retaining members for attachment to cargo;

said load sensors, disconnect means, support lines and retaining members acting in cooperation to provide an attachment between the helicopter and cargo.

21. A helicopter external cargo suspension system according to claim 1 further comprising:

duration means for providing a duration signal indicative of the duration of said failure mode;

fuzzification means responsive to said weight signals and said duration signal for providing fuzzy input signals indicative thereof;

rule base means for providing at least one new mode selection rule, each new mode selection rule representing a suitable new mode selection decision;

said signal processing means applying said fuzzy input signals to said new mode selection rules for providing a new mode fuzzy output signal;

defuzzification means responsive to said new mode fuzzy output signal for providing a crisp output signal indicative thereof; and mode selection means responsive to said crisp output signal for providing a disconnect signal to all of said disconnect means in response to a release load new mode, and for retaining said cargo on said suspension points in response to a retain load new mode.

22. A helicopter external cargo suspension system according to claim 21 further comprising a composite mode selection rule base means for providing a composite mode selection signal for each possible combination of said fuzzy input signals, said composite mode selection rule base being generated as a composition of said new mode selection rules.

23. A helicopter external cargo suspension system according to claim 22 further comprising memory means for storing said composite mode selection rule base means.

24. A helicopter external cargo suspension system according to claim 21 wherein said fuzzification means comprises:

scaling means for applying a scale factor to said weight signals and said duration signals to thereby provide a corresponding scaled value signal in relation to discrete segments ($u_i$) on a normalized scale;

membership weight assignment means responsive to said scaled value signals for providing a membership weight ($\omega_i$) value at each discrete segment ($u_i$) on said normalized scale for each of said scaled value signals; and each of said fuzzy input signals thereby being represented as a set of ordered pairs of discrete segments and corresponding membership weights ($u_i, \omega_i$).

25. A helicopter external cargo suspension system according to claim 24 wherein said defuzzification means comprises means for providing said crisp output signals as the weighted sum of each of said membership weights in excess of a threshold value for each of said segments.

* * * * *